United States Patent
Koo et al.

(10) Patent No.: US 9,805,706 B2
(45) Date of Patent: Oct. 31, 2017

(54) METHOD FOR MANUFACTURING SOUNDPROOFING BOARD PART HAVING EXCELLENT SOUND ABSORPTION PERFORMANCE AND SOUNDPROOFING BOARD PART MANUFACTURED BY THE SAME

(71) Applicants: Hyundai Motor Company, Seoul (KR); Kia Motors Corporation, Seoul (KR)

(72) Inventors: Hong Mo Koo, Gyeonggi-Do (KR); Jae Eun Chang, Gyeonggi-Do (KR); Dong Jun Lee, Gyeonggi-Do (KR); Kie Youn Jeong, Gyeonggi-Do (KR); Bong Hyun Park, Gyeonggi-Do (KR); Kil Bu Joo, Ulsan (KR); Boo Youn An, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 66 days.

(21) Appl. No.: 14/689,256

(22) Filed: Apr. 17, 2015

(65) Prior Publication Data
US 2016/0035338 A1 Feb. 4, 2016

(30) Foreign Application Priority Data
Jul. 30, 2014 (KR) .................. 10-2014-0097476

(51) Int. Cl.
  *G10K 11/162* (2006.01)
  *B29B 17/04* (2006.01)
  (Continued)

(52) U.S. Cl.
CPC ........ *G10K 11/162* (2013.01); *B29B 17/0042* (2013.01); *B29B 17/04* (2013.01);
(Continued)

(58) Field of Classification Search
CPC ........... B32B 2323/10; B32B 2605/00; B32B 2607/00; B32B 5/18; B32B 27/065;
(Continued)

(56) References Cited

U.S. PATENT DOCUMENTS

| 6,598,701 B1 * | 7/2003 | Wood .................. G10K 11/162 181/284 |
| 2013/0341120 A1 * | 12/2013 | Koo ....................... B32B 27/40 181/290 |
| 2014/0326535 A1 * | 11/2014 | Chang .................... B60R 13/08 181/290 |

FOREIGN PATENT DOCUMENTS

| KR | 10-1020140 B1 | 3/2011 |
| KR | 10-2011-0089468 | 8/2011 |

(Continued)

*Primary Examiner* — Vishal I Patel
(74) *Attorney, Agent, or Firm* — Mintz Levin Cohn Ferris Glovsky and Popeo, P.C.; Peter F. Corless

(57) ABSTRACT

Disclosed is a method for manufacturing a soundproofing board part having improved sound absorption performance. The soundproofing board part is manufactured by using, as a material, a recycled soundproofing material which contains a polyurethane foam having excellent sound absorption performance and impact resilience during the press molding; and by producing a sound absorption part on the back surface of the soundproofing board part through a remolding processing method. Also disclosed is a soundproofing board part manufactured by the method.

Accordingly, sound absorption performance of the soundproofing board part is improved by about 20% or greater, manufacturing cost thereof may be reduced by recycled resources utilizing waste sheets, and manufacturing process may be simplified compared the related art.

28 Claims, 10 Drawing Sheets

<PROCESS OF MANUFACTURING VEHICLE SOUNDPROOFING BOARD PART IN RELATED ART (FIRST STEP)>

<PLACING AND THERMALLY BONDING SOUND ABSORPTION NON-WOVEN FABRIC ON BACK SURFACE OF PRODUCT (SECOND STEP)>

(51) Int. Cl.

| | |
|---|---|
| B29C 39/00 | (2006.01) |
| B29C 39/02 | (2006.01) |
| B29C 69/00 | (2006.01) |
| B32B 5/18 | (2006.01) |
| B32B 27/06 | (2006.01) |
| B32B 27/12 | (2006.01) |
| B32B 27/32 | (2006.01) |
| B32B 37/06 | (2006.01) |
| B32B 38/00 | (2006.01) |
| B32B 5/02 | (2006.01) |
| B32B 5/24 | (2006.01) |
| B29B 17/00 | (2006.01) |
| B29C 43/00 | (2006.01) |
| B32B 37/24 | (2006.01) |
| B60R 13/02 | (2006.01) |
| B60R 13/08 | (2006.01) |
| B60R 5/04 | (2006.01) |
| B29K 23/00 | (2006.01) |
| B29K 75/00 | (2006.01) |
| B29K 105/04 | (2006.01) |
| B29K 105/12 | (2006.01) |
| B29K 105/26 | (2006.01) |
| B29K 309/08 | (2006.01) |
| B29K 311/10 | (2006.01) |
| B29L 31/00 | (2006.01) |
| B32B 37/18 | (2006.01) |

(52) U.S. Cl.
CPC .......... *B29C 39/003* (2013.01); *B29C 39/026* (2013.01); *B29C 43/003* (2013.01); *B29C 69/00* (2013.01); *B32B 5/022* (2013.01); *B32B 5/18* (2013.01); *B32B 5/245* (2013.01); *B32B 27/065* (2013.01); *B32B 27/12* (2013.01); *B32B 27/32* (2013.01); *B32B 37/06* (2013.01); *B32B 37/24* (2013.01); *B32B 38/0012* (2013.01); *B60R 5/044* (2013.01); *B60R 13/0268* (2013.01); *B60R 13/08* (2013.01); *B29K 2023/12* (2013.01); *B29K 2075/00* (2013.01); *B29K 2075/02* (2013.01); *B29K 2105/04* (2013.01); *B29K 2105/12* (2013.01); *B29K 2105/26* (2013.01); *B29K 2309/08* (2013.01); *B29K 2311/10* (2013.01); *B29K 2995/0002* (2013.01); *B29L 2031/721* (2013.01); *B32B 37/182* (2013.01); *B32B 2250/02* (2013.01); *B32B 2250/03* (2013.01); *B32B 2250/20* (2013.01); *B32B 2262/0253* (2013.01); *B32B 2262/0276* (2013.01); *B32B 2262/06* (2013.01); *B32B 2262/065* (2013.01); *B32B 2262/101* (2013.01); *B32B 2266/0278* (2013.01); *B32B 2305/022* (2013.01); *B32B 2305/22* (2013.01); *B32B 2305/70* (2013.01); *B32B 2307/102* (2013.01); *B32B 2315/085* (2013.01); *B32B 2317/10* (2013.01); *B32B 2323/10* (2013.01); *B32B 2375/00* (2013.01); *B32B 2605/00* (2013.01); *B32B 2607/00* (2013.01); *Y02W 30/62* (2015.05)

(58) Field of Classification Search
CPC ......... B32B 27/12; B32B 27/32; B32B 37/06; B32B 37/182; B32B 38/0012; B32B 2250/03; B32B 2262/065; B32B 2262/101; B32B 2266/0278; B32B 2305/022; B32B 2305/22; B32B 2305/70; B32B 2307/102; B32B 2315/085; B32B 2317/10; B32B 5/022; B32B 5/245; B32B 2250/02; B32B 2262/0253; B32B 2262/0276; B32B 37/24; B32B 2250/20; B32B 2262/06; B32B 2375/00; B60R 13/08; B60R 13/0268; B60R 5/044; G10K 11/162; B29B 17/04; B29B 17/0042; Y02W 30/62; B29L 2031/721; B29C 39/003; B29C 39/026; B29C 69/00; B29C 43/003; B29K 2023/12; B29K 2075/00; B29K 2105/04; B29K 2105/12; B29K 2105/26; B29K 2309/08; B29K 2311/10; B29K 2995/0002; B29K 2075/02

See application file for complete search history.

(56) References Cited

FOREIGN PATENT DOCUMENTS

| KR | 10-2011-0095663 | 8/2011 |
|---|---|---|
| KR | 10-2011-0121071 | 11/2011 |
| KR | 10-2011-0128980 A | 12/2011 |
| KR | 10-2013-0005593 | 1/2013 |
| KR | 10-2013-0120567 | 11/2013 |
| KR | 10-2014-0000600 | 1/2014 |

* cited by examiner

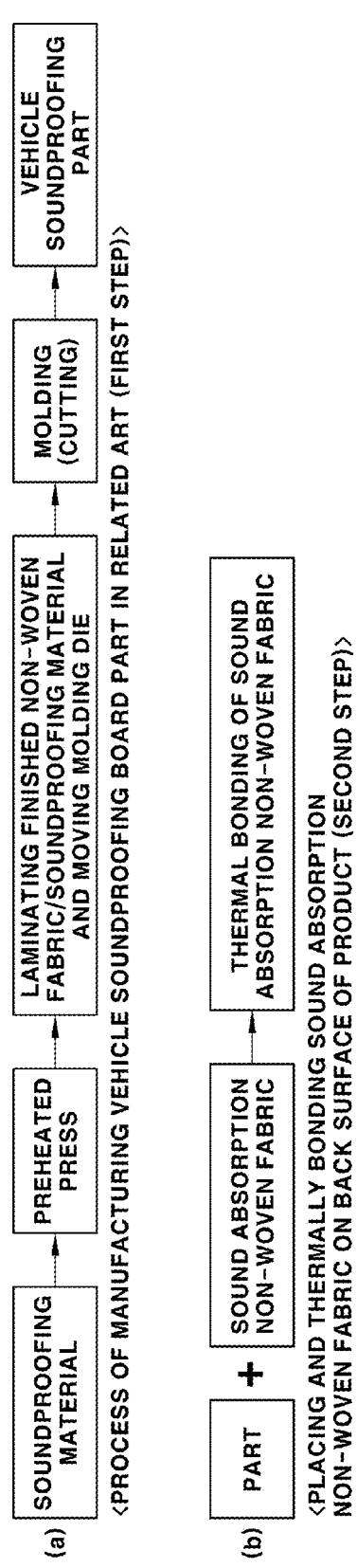
FIG. 1
FIG. 2

<RESULT OF EVALUATING PART PERFORMANCE_SOUND ABSORPTION>

⟨PROCESS OF MANUFACTURING RECYCLING SOUNDPROOFING MATERIAL⟩

<MOLDING DIE CHECKERED STRUCTURE>

METHOD FOR MANUFACTURING SOUNDPROOFING BOARD PART HAVING EXCELLENT SOUND ABSORPTION PERFORMANCE AND SOUNDPROOFING BOARD PART MANUFACTURED BY THE SAME

CROSS-REFERENCE TO RELATED APPLICATION

This application claims under 35 U.S.C. §119(a) the benefit of Korean Patent Application No. 10-2014-0097476 filed on Jul. 30, 2014, the entire contents of which are incorporated herein by reference.

TECHNICAL FIELD

The present invention relates to a method for manufacturing a soundproofing board part having improved sound absorption performance and a soundproofing board part manufactured by the method. In particular, the soundproofing board part may be manufactured, during the press molding, with a recycled soundproofing material which contains a polyurethane foam having substantial sound absorption performance and impact resilience. And subsequently, by a remolding process, a sound absorption part is formed on the back surface of the soundproofing board part with a checkered pattern figure including a volume part that has a thickness of about 3 to 5 mm, while the soundproofing board part has a basic thickness of 1.6 to 2.0 mm.

BACKGROUND

Based on regulations to scrapped vehicle recycling in Europe and Korea which aims to recycling rate of about 85% or greater after the year 2015 in efforts to prevent depletion of resources and environmental contamination, vehicle industries have conducted research and development in various methods to recycle plastics generated from scrapped vehicles. Further, due to improvement in vehicle performances and increased supply rate of vehicles, the vehicle may be a living space rather than a traditional transportation means, such that an indoor comfort may be important to users.

Accordingly, in the related art, development for improving performance of soundproofing parts has been actively conducted to absorb and remove noise generated from inside and outside of the vehicle.

For example, a technology of manufacturing a soundproofing material by recycling waste sheets such as polyurethane foam, thermosetting polymer generated from scrapped vehicles has been developed to improve a scrapped vehicle recycling rate. Accordingly, the sound absorption performance as a soundproofing material has been substantially improved, however, development of use has not been sufficient to be applied practically.

Currently, all of the waste sheets generated from scrapped vehicles have been processed by incineration and landfill. In the related art and in the present invention, vehicle soundproofing board parts have been developed from the scrapped vehicles to increase recycling rate thereof.

Currently used vehicle soundproofing board parts include a luggage covering, a package tray, a luggage side trim and the like. For example, the sound absorption performance is imparted by adhering a sound absorption non-woven fabric to the back surface of the part, but sound absorption performance is not sufficient. Since the adhesion method includes: manufacturing a board part; disposing a sound absorbing non-woven fabric; and thermally bonding the sound absorbing non-woven fabric to the part, the molding process is complicated and manufacturing cost is increased due to the expensive sound absorbing non-woven fabric.

Accordingly, there is a desperate need for suggesting a method for manufacturing a soundproofing board part having improved sound absorption performance by recycling waste sheets, and thus the noble soundproofing board part may substitute the above-described conventional method.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In a preferred aspect, the present invention provides a soundproofing board part which is produced by simplified and, price-competitive process. Further, the soundproofing board part may also have substantially improved sound absorption performance by producing a sound absorption part having a checkered structure on the back surface of the soundproofing board part through a remolding process. The remodeling process for producing the sound absorption part may substitute a process of disposing and thermally bonding a sound absorption non-woven fabric on the back surface of the soundproofing board part. As such, the complicated process in the related art may be simplified and price-competitiveness as well as sound absorption performance may be substantially improved, because additional use of expensive non-woven fabric in the related arts is avoided.

In one aspect, a method for manufacturing a soundproofing board part may include: preparing a recycled soundproofing material using a recycled soundproofing material manufactured from a ground polyurethane (PU) foam product obtained by grinding waste sheets; and molding the recycled soundproofing material in a preheating die and a molding die. In particular, during the preheating die and the molding die process, a sound absorption part may be attached on the back side of the soundproofing board part and formed with a checkered structure, such that the sound absorption part may have a checkered pattern figure including a volume part having a thickness of about 3 to 5 mm and the soundproofing board part may have a basic thickness of about 1.6 to 2 mm. In other words, since the dies has a checkered structure, a concave part and a convex part as the volume part may be formed; the concave part may have the basic thickness of the soundproofing board part which is a thickness of about 1.6 to 2.0 mm, and the convex part may be the volume part, which has a thickness of about 3 to 5 mm.

In another aspect, a soundproofing board part having substantially improved sound absorption performance manufactured by the method as described herein may be provided.

In an exemplary embodiment, a method for manufacturing a soundproofing board part having substantially improved sound absorption performance may include: preparing a recycled soundproofing material manufactured from a ground polyurethane (PU) foam product obtained by grinding waste sheets, and molding the recycled soundproofing material in a preheating die and a molding die, in which a checkered structure may be introduced to form a sound absorption part, thereby forming the sound absorption part on the back surface of the part.

In an exemplary embodiment, a soundproofing board part having substantially improved sound absorption performance may be manufactured by the method as disclosed herein.

According to various exemplary embodiments of the present invention, the soundproofing board parts and manufacturing methods thereof may provide advantages.

By the method for manufacturing a soundproofing board part, an effect of reducing annual cost of about 3.2 billion won may be obtained by recycled waste sheets generated from scrapped vehicles, and the scrapped vehicles may be used environmentally friendly due to the improvement in recycling rate of vehicles by recycling the waste sheets which have been subjected to landfill or incineration in the related art. For example, the expense required to dispose of waste sheets may be saved by about 1.1 billion won annually. Further, domestic scrapped vehicle disposal regulations may be positively addressed.

Moreover, the present invention may enhance sound absorption performance of a vehicle board part by about 20% or greater by laminating the conventional soundproofing material according along with the recycled soundproofing material rather than using the conventional soundproofing material singly by molding. For example, sound absorption ratio (a, maximum value) may be improved from about 0.32 of the conventional material to about 0.38 or greater by using the sound proofing board part of the present invention.

Since the soundproofing board part may be manufactured by a single process using, as a material, a recycled PU foam soundproofing material which has substantial in sound absorption performance and impact resilience, the present invention may simplify the work by substituting the method in the related art which includes two-step processes of disposing and thermally bonding a sound absorption non-woven fabric on the back surface of the soundproofing board part (FIG. 1). Further, price-competitiveness may be increased because a recycled PU foam is used instead of an expensive non-woven fabric. In addition, since the thickness of the sound absorption part of the present invention may has a thickness two times or greater than that of the soundproofing board part in the related art, the sound absorption performance may be substantially improved.

When a soundproofing board part is manufactured, a sound absorption part having a thickness which is two times or greater than that of the existing sound absorption part may be formed by performing a primary molding in a preheating die in which a shape identical to that of a molding die is introduced, and subsequently performing cold molding or remolding as a secondary molding in the molding die. Accordingly, the sound absorption performance may be substantially improved and a transfer which may be generated on the front surface portion of the soundproofing board part may be reduced or eliminated.

The rigidity generally may deteriorate due to introduction of a sound absorption part to the conventional soundproofing board part. However, rigidity of the soundproofing board part of the invention may be to or greater than the rigidity of the conventional soundproofing board part by using a recycled soundproofing material including glass fiber.

Accordingly, the sound absorption board part may be widely applied to a part which requires substantially improved sound absorption performance, such as a luggage covering, a package tray, a covering shelf, a luggage trim and the like.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 shows a method for manufacturing a soundproofing board part in the related art, (a) is a process of manufacturing a package tray part of a vehicle in the related art, and (b) is a process of manufacturing a soundproofing board part by thermally bonding a sound absorption non-woven fabric placed on the back surface of the manufactured vehicle package tray part for each step;

FIG. 2 shows an exemplary process of manufacturing an exemplary soundproofing board part according to an exemplary embodiment of the present invention including: preheating exemplary materials such as a natural fiber-reinforced soundproofing material and a recycled soundproofing material and laminating the materials in a preheating die that introduces an exemplary sound absorption part shape, and subsequently performing the preheated material to cold molding or remolding in a molding die to form an exemplary sound absorption part on the back surface of the sound proofing board part for each step;

Figure 3:
FIG. 3 shows an exemplary natural fiber-reinforced soundproofing material and an exemplary recycled soundproofing material that may be used for an exemplary soundproofing board part of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Unless otherwise indicated, the term "part" as used herein may refer to a soundproofing board part, which generally requires mechanical strength rather than soundproofing property. For example, the soundproofing board (type) part may be manufactured to have a less thickness by pressing a typical soundproofing part, thereby providing substantial strength. In a preferred aspect of the present invention, the soundproofing board (type) part may be manufactured by a novel manufacturing method as described herein, to thereby substantially improve soundproofing property as well as mechanical strength.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in more detail.

In the related art, during manufacturing a vehicle soundproofing board part, the part has been separately manufactured as shown in FIG. 1 (a), and a soundproofing board part has been finally manufactured by disposing and thermally bonding a non-woven fabric for absorbing sound on the back surface of the part as shown in FIG. 1 (b). In other words, the method in the related art includes two steps of manufacturing the part and the sound absorption treatment.

As shown in FIG. 1 (a), a vehicle soundproofing board part is manufactured by preheating a natural fiber-reinforced felt having a thickness of about 5 to 10 mm or a fiber felt and performing cold/cutting molding on the felt. In general, since the part is usually compressed to a thickness level of about 1.6 to 2.0 mm to maintain rigidity of the part, sound absorption performance may not be obtained. Thus, sound absorption performance has been obtained by attaching the sound absorbing non-woven fabric to the back surface of the part through thermal bonding thereon as shown in FIG. 1 (b).

As such, since a method in the related art includes a primary process of manufacturing of a part and a secondary process of disposing and thermally bonding a sound absorption non-woven fabric on the back surface of the manufactured part, entire manufacturing process is complicated, and the non-woven fabric attached to the back surface thereof increases manufacturing costs.

Accordingly, the present invention provides improved sound absorption performance compared to the conventional soundproofing board part by performing a molding process to form a sound absorption part on the back surface of the part by using, as a material, a recycled soundproofing material, and molding, as a process, the recycled soundproofing material in a preheating die and a molding die. Particularly, a shape of the sound absorption part having a concave and convex shape of a checkered structure may be introduced in the preheating die or the molding die to form a figure such as a tetragonal shape or a hexagonal shape in the sound absorption part.

In other words, the 'sound absorption part shape' may include a concave and convex shape of a checkered structure selected from a tetragonal shape, a pentagonal shape, a hexagonal shape, or a modified shape thereof. Through the molding, the part may have a basic thickness of about 1.6 to 2 mm, and a sound absorption part including a volume part having a thickness of 3 to 5 mm is added to the part on its back surface. Particularly, the volume part may serve to absorb sound, and the basic thickness part may serve to provide rigidity.

Figure 7:
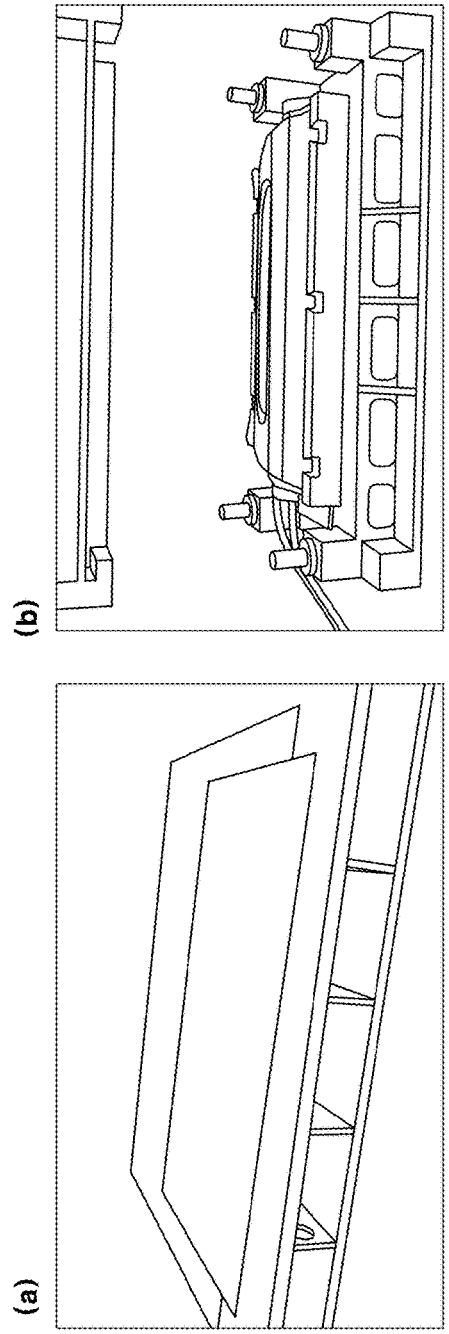
FIG. 7 illustrates (a) a photograph of a flat preheating die in the related art and (b) a photograph of an exemplary shaped preheating die according to an exemplary embodiment of the present invention.
Figure 8:
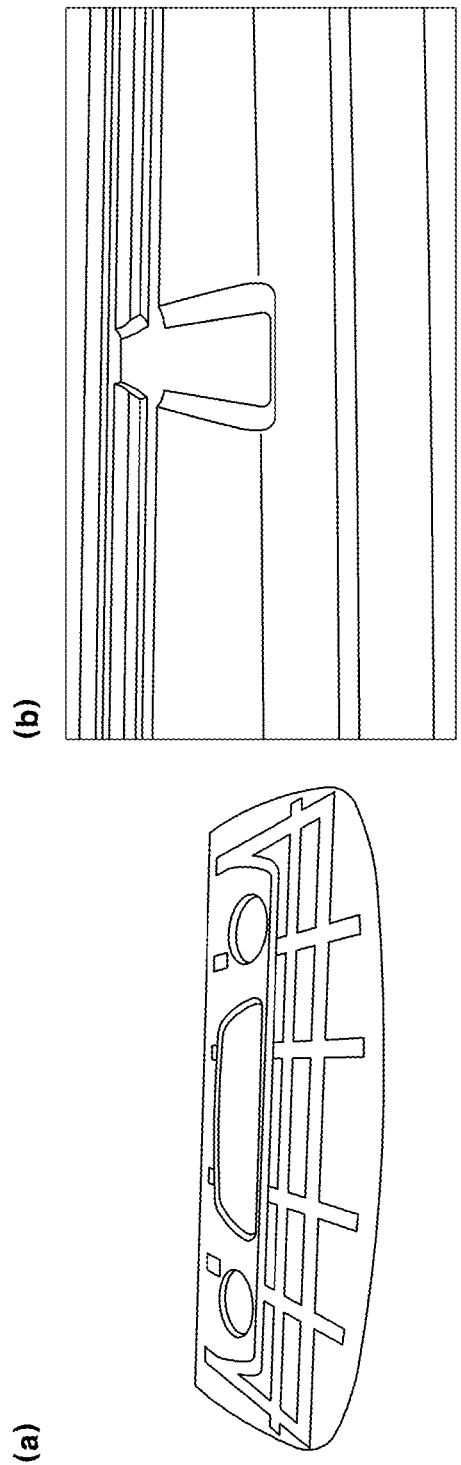
FIG. 8 shows (a) a photograph of a molding die including a concave and convex shape of an exemplary sound absorption part that are formed in an exemplary checkered structure to form a tetragonal shape according to an exemplary embodiment the present invention and (b) an enlarged view thereof.
Figure 10:
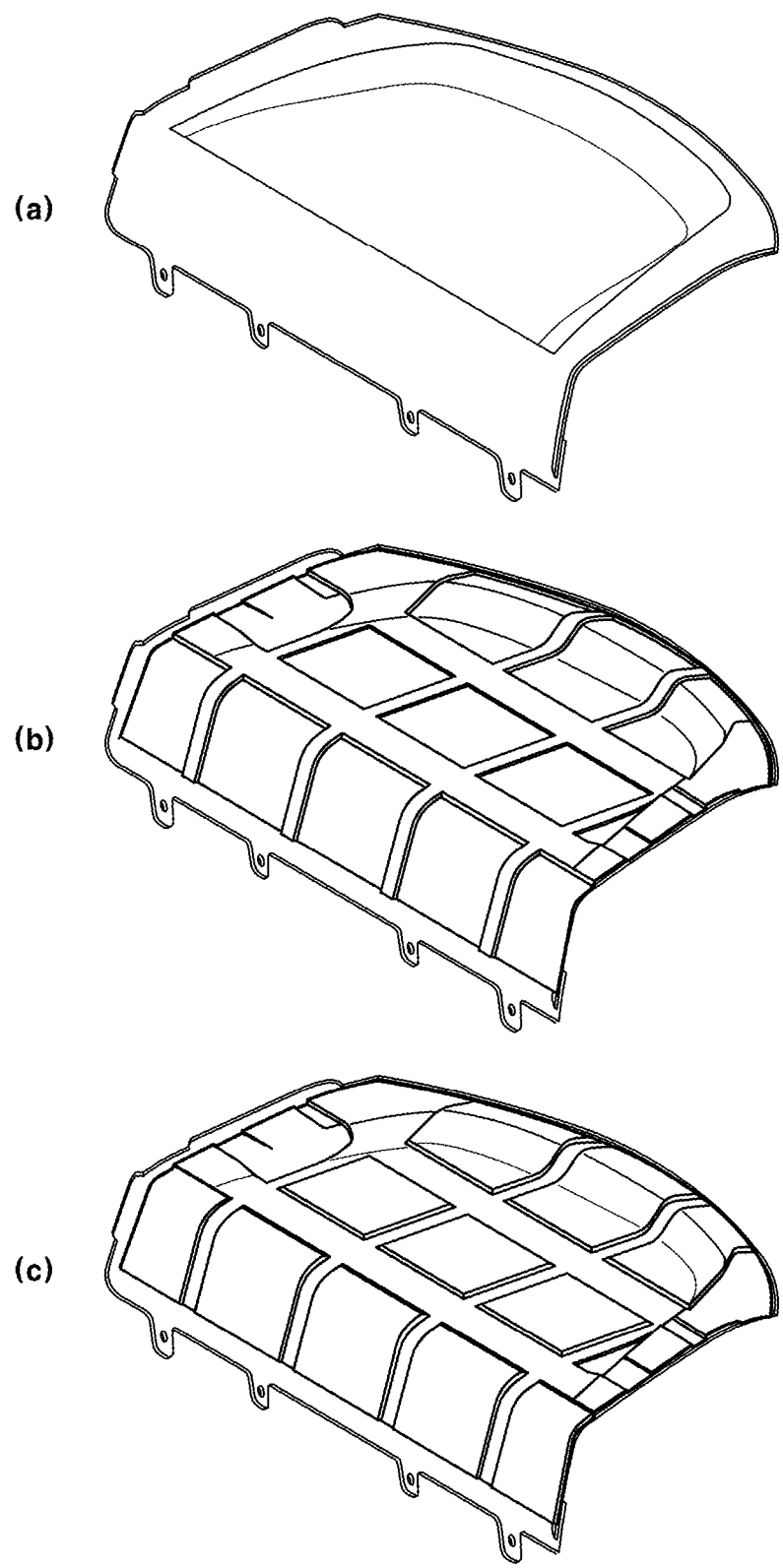
FIG. 10 illustrates (a) a back surface of a package tray which is a vehicle board part manufactured by a method in the related art, (b) a back surface of an exemplary package tray in which a checkered interval which is a convex part (a volume part) having a thickness of about 3 to 5 mm and a tetragonal shape which is a concave part (a basic thickness of the part) having a thickness of about 1.6 to 2 mm are formed through a molding process (remolding) according to an exemplary embodiment of the present invention, and (c) a back surface of an exemplary package tray according to an exemplary embodiment of the present invention, in which the convex part (the volume part) has a tetragonal shape and the concave part (the basic thickness of the part) is a checkered interval.

In other words, since the die shape of the present invention is a concave and convex shape, the part may have a concave part having a thickness of about 1.6 to 2 mm and a convex part of the volume part having a thickness of about 3 to 5 mm. An exemplary concave part may have a tetragonal shape, a pentagonal shape, a hexagonal shape, or a modified shape thereof according to the die shape, and the convex part may also have a tetragonal shape, a pentagonal shape, a hexagonal shape, or a modified shape thereof as shown in FIGS. 7, 8, and 10.

Accordingly, since the materials of the part is manufactured into the part by the method of the present invention, the concave part may be a basic thickness of the soundproofing board part, and the convex part may be a volume part such that the part may be formed to have a basic thickness of about 1.6 to 2 mm and include the sound absorption part that includes the volume part having a thickness of about 3 to 5 mm as described above.

Meanwhile, a balance may be made between sound absorption performance and rigidity. For example, the area of the volume part may be increased when the part requires further sound absorption performance and the area of the volume part may be reduced when the part requires substantial rigidity. Accordingly, the sound absorption part may be formed with selected a die shape for the part.

The method for manufacturing a soundproofing board part according to an exemplary embodiment of the present invention may include:

(i) preparing a soundproofing material by laminating, as a two-layer structure, a natural fiber-reinforced soundproofing material and a recycled sound absorption material which is manufactured by using a ground polyurethane (PU) foam product from grinding waste sheets;

(ii) preheating the laminated soundproofing material in a preheating mold;

(iii) laminating a finished non-woven on the laminated and preheated soundproofing material; and (iv) forming, in a molding die, a sound absorption part by performing cold molding (remolding) on the soundproofing material including laminated the natural fiber-reinforced soundproofing material, the recycled soundproofing material, and the finished non-woven fabric from step (iii).

The method for manufacturing a soundproofing board part according to an exemplary embodiment of the present invention may include:

(i) preparing the recycled soundproofing material prepared from a ground polyurethane (PU) foam product obtained by grinding waste sheets;

(ii) preheating the recycled soundproofing material in a preheating mold;

(iii) laminating a finished non-woven on the preheated soundproofing material; and (iv) forming, in a molding die, a sound absorption part on the part by performing cold molding (remolding) on the sound proofing material having laminated the recycled soundproofing material and the finished non-woven fabric in the step (iii).

In particular, the natural fiber-reinforced soundproofing material may be optionally used, when rigidity of the soundproofing board part is required. For example, for a part which requires rigidity as well as sound absorption performance, (the natural fiber-reinforced soundproofing material may be used together. FIG. 2 illustrates an exemplary process of manufacturing an exemplary soundproofing board part according to an exemplary embodiment of the present invention. Hereinafter, the present invention will be described in detail for each step.

The natural fiber-reinforced soundproofing material used as a material in the present invention has been used as a soundproofing material in the related art. In addition, a soundproofing material may also be prepare by mixing an amount of about 40 to 50 wt % of polypropylene; an amount of about 40 to 50 wt % of kenaf; and an amount of about 0 to 20 wt % of polyethylene terephthalate (PET), based on the total weight of the soundproofing material; and by processing the mixed materials such as carding, lamination, needle punching, and thermal-roller processes, without limitation.

The soundproofing material may be prepared by mixing an amount of about 40 to 60 wt % of a ground polyurethane (PU) foam product obtained by grinding waste sheets; an amount of about 10 to 20 wt % of a low melting point polyester-based fiber; an amount of about 10 to 20 wt % of polypropylene (PP); and an amount of about 10 to 20 wt % of kenaf, based on the total weight of the soundproofing material; and by processing the mixed materials such as carding, lamination, needle punching, and thermal-roller processes, without limitation.

In addition, the soundproofing material may be manufactured by the method as previously described in KR. Pat. No. 10-1371811, which is incorporated herein by reference in its entirety, and the examples may not be limited thereto.

When the kenaf used in the natural fiber-reinforced soundproofing material and the recycled soundproofing material, jute, flax (lien), hemp, or ramie may be used, but jute may be particularly used.

In addition, the recycled soundproofing material may further include an amount of about 0 to 20 wt % of glass fiber in order to reinforce rigidity of the part. Although the effect of enhancing rigidity of the part may be substantially improved due to introduction of glass fiber, there is a disadvantage in that the floating of short glass fibers may occur such that the manufacturing process of soundproofing material may be difficult. Accordingly, long fibers may be used particularly for rigidity and processability.

Figure 4:
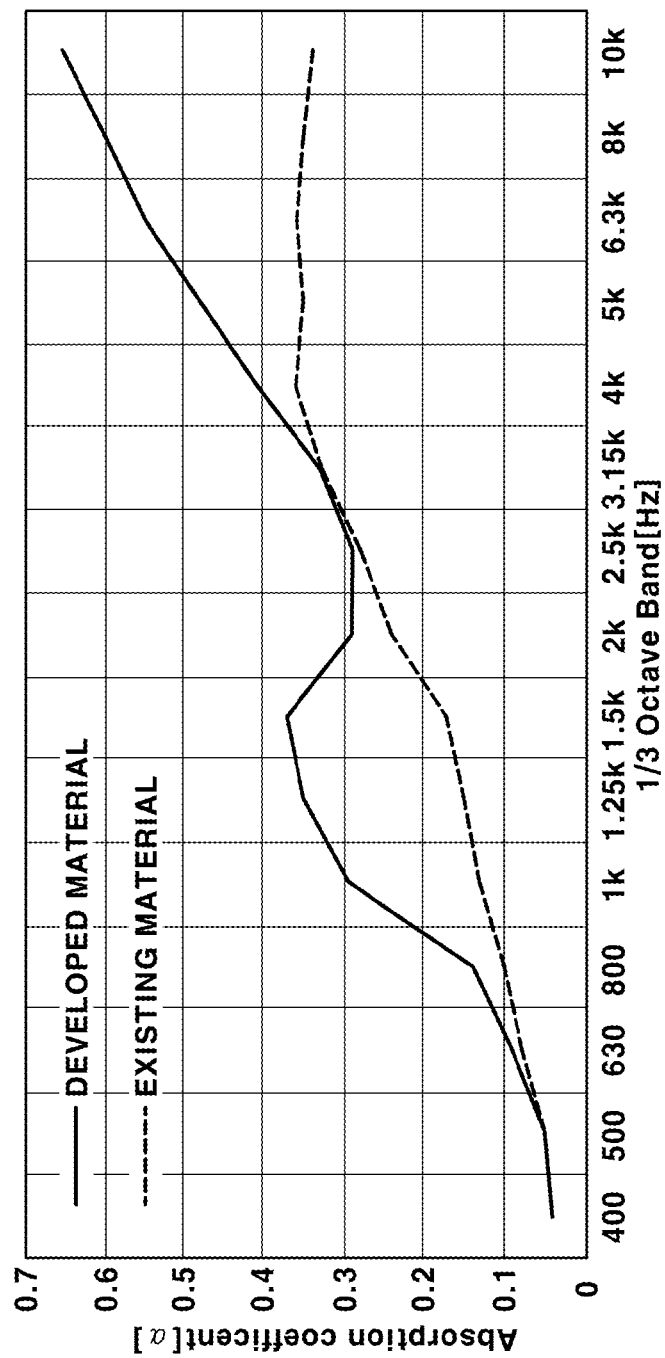
FIG. 4 is an exemplary graph showing results of evaluating sound absorption of the materials, (a) when the conventional soundproofing material is used, and (b) when the recycled soundproofing material is used according to an exemplary embodiment of the present invention.
Figure 5:
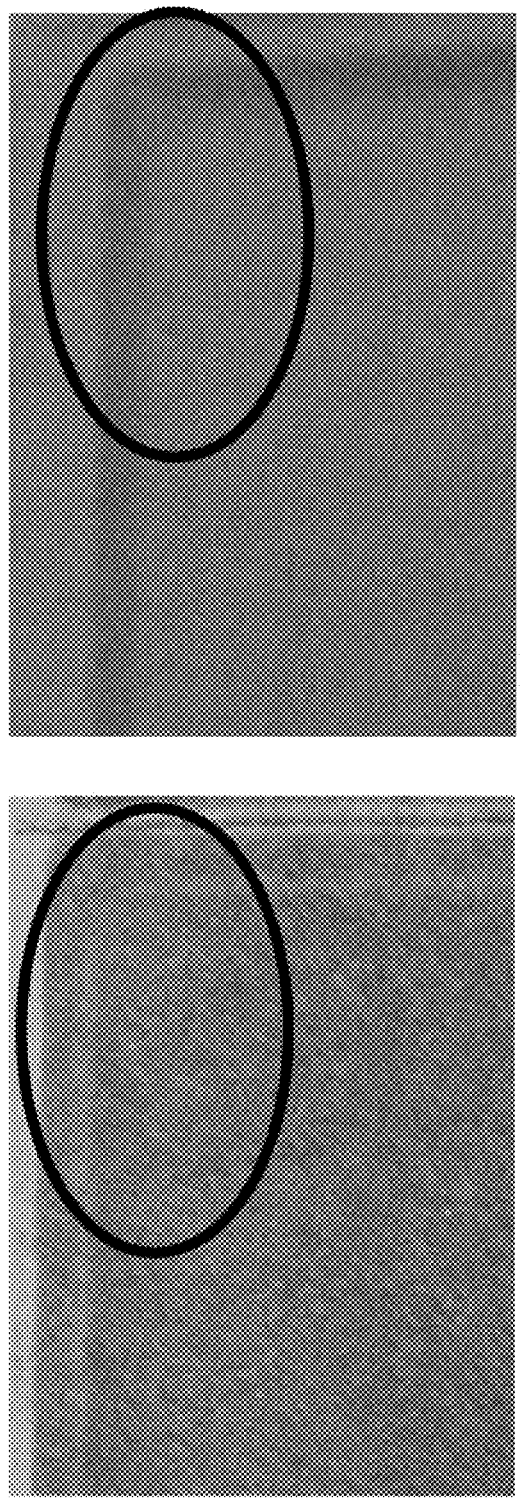
FIG. 5 shows a photograph comparing the molding states of the winding sites of the sound absorption parts manufactured by using the materials of (a) the conventional soundproofing material and (b) an exemplary recycled soundproofing material according to an exemplary embodiment of the present invention.

Although the natural fiber-reinforced soundproofing material has substantial rigidity, the sound absorption performance may not be sufficient, and further, as shown in FIG. 3 (*a*) and FIG. 5 (*a*), the winding sites may be distorted during the press molding due to continuity between fibers of the natural fiber-reinforced soundproofing material. Furthermore, FIG. 4 illustrates the result of evaluating sound absorption of the natural fiber-reinforced soundproofing material and the recycled soundproofing material, and sound absorption performance of the recycled soundproofing material is improved compared to that of the natural fiber-reinforced soundproofing material.

FIG. 5 shows a photograph comparing the molding states of (a) the winding sites of the sound absorption parts manufactured by using the materials of the conventional soundproofing material and (b) the winding sites of the sound absorption parts manufactured by using the materials of the recycled soundproofing material according to an exemplary embodiment of the present invention. When the recycled soundproofing material is used, distortion of winding sites may be reduced.

Accordingly, the recycled soundproofing material manufactured by using a ground polyurethane (PU) foam product obtained by grinding waste sheets may be used, and in particular, when a soundproofing board part requires rigidity, both the natural fiber-reinforced soundproofing material and the recycled soundproofing material may be used to manufacture the soundproofing board part. Table 1 shows components and content ratios of the natural fiber-reinforced soundproofing material in the related art and (b) the recycled soundproofing material.

TABLE 1

(Unit: wt %)

| Classification | | Existing sound-proofing board | Soundproofing board of the present technology |
|---|---|---|---|
| Natural fiber-reinforced soundproofing material (a, soundproofing material in the related art) | PP Fiber | 40-50 | 40-50 |
| | Kenaf (Jute) | 40-50 | 40-50 |
| | PET fiber | 0-20 | 0-20 |
| (b) Recycled PU foam soundproofing material layer | Ground PU foam product | — | 40-60 |
| | LM PET fiber | — | 10-20 |
| | PP Fiber | — | 10-20 |
| | Kenaf (Jute) | — | 10-20 |
| | Glass fiber | — | 0-20 |
| Structure | | One-layer structure | Two-layer structure (lamination) |
| Maximum load (kgf) | | 6.2 | 5.8-6.4 |

Figure 6:
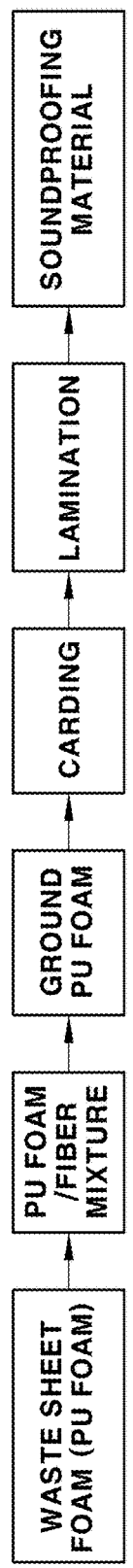
FIG. 6 shows an exemplary process of manufacturing a soundproofing material by recycling waste sheets such as polyurethane foam, thermosetting polymer and the like, according to an exemplary embodiment of the present invention.

Meanwhile, FIG. 6 illustrates an exemplary method of manufacturing an exemplary recycled soundproofing material used in the present invention as previously described in the patent KR. Pat No. 10-1371811, which is incorporated herein by reference in its entirety. In particular recycled soundproofing material manufactured by mixing a ground polyurethane foam product having a size of about 3 mm or less with the fibers, since the recycled soundproofing material containing polyurethane foam may have substantially improved and the sound absorption performance thereof is greater than the conventional fiber board such as the conventional natural fiber-reinforced soundproofing material (board). Further, since an angular shape of the end in the sound absorption part shapes may be implemented easily and substantially by containing polyurethane which has impact resilience characteristics during the molding of the part compared to for the existing natural fiber reinforced soundproofing material (board), the recycled soundproofing material manufactured by using a ground polyurethane foam product within the range may be used.

In Step (i), the material may be a primary lamination process to prepare as a two-layer structure with laminating (a) the natural fiber-reinforced soundproofing material; and (b) the recycled soundproofing material manufactured by using a ground polyurethane (PU) foam product obtained by grinding waste. Alternatively, when the vehicle soundproofing board part which does not require rigidity, only the recycled soundproofing material may be used. In other words, the natural fiber-reinforced soundproofing material may be optionally used in order to provide both sound absorption performance and rigidity based on the vehicle parts.

In step (ii), the recycled soundproofing material may be preheated with a preheated die when only the laminated soundproofing material or the recycled soundproofing material is used. In the preheating process, the preheating may be performed at a temperature of about 190 to 220° C. for about 60 to 100 seconds by using a preheating die thereby, introducing 'sound absorption part shape'.

In particular, the preheating die in which the 'sound absorption part shape' is introduced may be a die which includes the concave and convex shape of a checkered structure selected from a tetragonal shape, a pentagonal shape, a hexagonal shape or a modified shape thereof to form a sound absorption part. For example, the tetragonal shape may have a greater sound absorption ratio than that of the hexagonal shape, whereas the hexagonal shape may have a greater rigidity than that of the tetragonal shape.

In other words, based on the degree of rigidity required to the vehicle parts, the degree of sound absorption ratio required and determination whether the edge may be less generated during the molding, the shape of the figure may be selectively applied.

In general, since sound absorption performance is proportional to the thickness or volume of the sound absorption part, as illustrated in FIG. 5, collapse of edges from the original shape may occur, when the angular part shape at the end of the sound absorption part is subjected to press molding, thereby deteriorating sound absorption performance due to reduction of the volume of the sound absorption part. Accordingly, a tetragonal checkered shape rather than a hexagonal checkered shape may be advantageous for the part which requires greater sound absorption performance. However, since the hexagonal checkered shape has greater rigidity than the tetragonal checkered shape, the hexagonal shape may be more advantageous for the part which requires rigidity. Accordingly, a shape may be optionally applied according to the performance of the part required. This can be confirmed through Test Examples to be described below.

While a 'flat die' in which a shape is not introduced into a preheating die during preheating process is used in the related art, a 'shaped die' may be particularly used to form a sound absorption part on the back surface of the material as mentioned above.

As such, the shaped die may refer a die in which a concave and convex shape of a checkered structure selected from a tetragonal shape, a pentagonal shape, a hexagonal shape, or a modified shape thereof is introduced. In FIG. 7(a), a photograph shows a 'flat preheating die' used in the related art, and in FIG. 7(b), a photograph shows an exemplary 'shaped preheating die' in which an exemplary sound absorption part shape having a concave and convex shape of a checkered structure for introducing the tetragonal shape according to an exemplary embodiment the present invention is introduced.

Particularly, the preheating process may be performed at a temperature of about 190 to 220° C. for about 60 to 100 seconds as mentioned above. When the preheating temperature is less than about 190° C., PET in the constituent components of the recycled soundproofing material may not be molded, and when the temperature is greater than about 220° C., kenaf in the sound absorption material may be carbonized or oxidized) and burnt odor may be generated from a final product. Accordingly, the preheating process may be performed in the range as described above. Further, when the preheating time is performed for less than about 60 seconds, heat may not be sufficiently transferred to the core of the sound absorption material and molding may not be performed sufficiently. When the preheating time is performed for greater than about 100 seconds, the sound absorption material may be carbonized at high temperatures and by a continuous heat transfer. Further, when the working time is extended, the costs for producing parts may be increased. Accordingly, the preheating process may be performed within the time range as described above.

Meanwhile, the molding conditions during manufacturing of the board part in the related art and the molding conditions according to an exemplary embodiment of the present invention are shown in the following Table 2, and the process according to an exemplary embodiment of the present invention may be easily performed at reduced temperatures compared to the molding conditions in the related art.

In particular, when the preheating is performed in a 'flat preheating die' in the related art, sufficient preheating may be required for improving stretching to produce a winding product by cold molding. In contrast, since preheating may be performed with a shape corresponding to the final product or molding die in an exemplary embodiment of the present invention, molding at a temperature may be performed at reduced temperature, and thus burnt odor which is caused during the high temperature preheating process in the related art may be reduced or eliminated.

TABLE 2

| Classification | | Existing molding | Molding of the present technology |
|---|---|---|---|
| 1. Lamination of materials | | | Two-layer structure lamination |
| 2. Preheating process | Die form | Flat die | Part shaped die |
| | Temperature (° C.) | 200-250 | 190-220 |
| | Time (sec) | 80-90 | 80-90 |
| 3. Lamination of finished non-woven fabrics | | Lamination before molding | Lamination before molding |
| 4. Molding process | Temperature (° C.) | 10-20 | 10-20 |
| | Time (sec) | 80-90 | 80-90 |
| 5. Sound absorption part | Width (mm) | None | 100 |
| | Thickness (mm) | | 4 |

The preheating die in which the sound absorption part shape is introduced may be same as the molding die in step (iv) to be described below with the checkered pattern. Particularly, the die in which a concave and convex shape of a checkered structure selected from a tetragonal shape, a pentagonal shape, a hexagonal shape or a modified shape thereof is introduced may be used. FIG. 8 is a photograph illustrating (a) a molding die in which a concave and convex shape of a checkered structure for forming the tetragonal shape is introduced and (b) the checkered interval thereof according to an exemplary embodiment of the present invention. When the die is used, the checkered interval and the tetragonal shape are formed with a convex part which becomes a volume part and a concave part which corresponds to a basic thickness of the part, respectively, on the back surface of the part.

Using the die in which the same shape is introduced as described above, cold molding, or remolding may be again performed at a temperature condition of about 10 to 20° C. to form a sound absorption part having a thickness two times or more greater than the thickness of the conventional part, thereby improving sound absorption performance and reducing a transfer which may be generated on the front surface portion of the soundproofing material board part. This will be described in detail even in step (iv).

In step (iii), a finished non-woven fabric such as wall paper may be laminated on the laminated soundproofing material which is preheated. For example, when only the recycled soundproofing material is used in step (i), only the finished non-woven may be laminated on the preheated recycled soundproofing material.

In particular, the finished non-woven fabric may be prepared by mixing an amount of about 50 to 80 wt % of a polyester-based fiber and an amount of about 20 to 50 wt % of a low melting point polyester-based fiber and prepared by, but not limited to, carding, lamination, needle punching, and thermal-roller processes as generally used process in the related art.

The finished non-woven fabric may be laminated on the top of the natural fiber-reinforced soundproofing material, or laminated on the top of the recycled soundproofing material. Further, the recycled soundproofing material may be disposed on the top or bottom of the natural fiber-reinforced soundproofing material. Particularly, the recycled soundproofing material may be disposed in a direction from which noise is generated to improve the sound absorbing function of the part.

Figure 9:
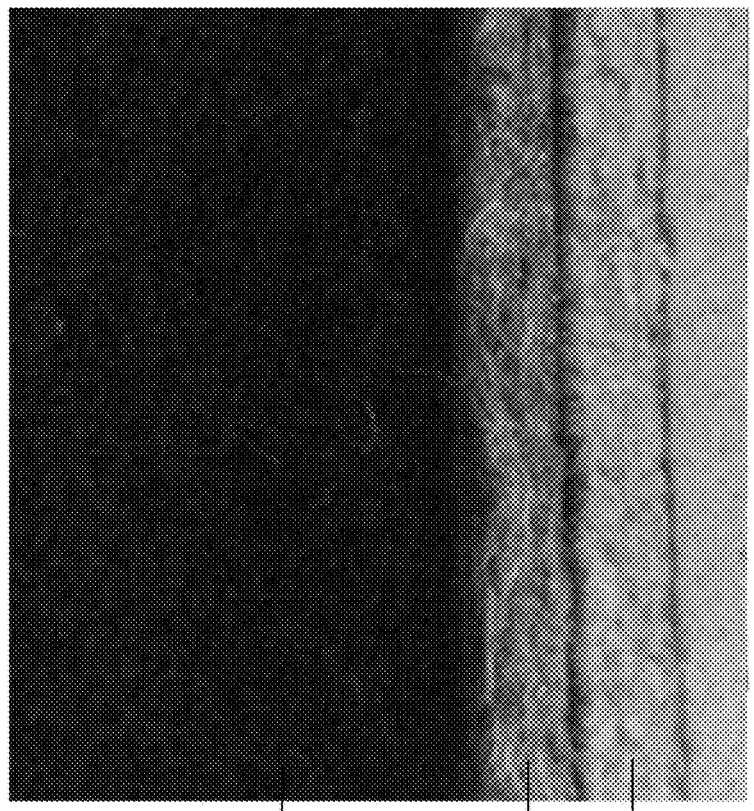
FIG. 9 shows a photograph of a cross-section of an exemplary soundproofing board part according to an exemplary embodiment of the present invention.

FIG. 9 is a photograph illustrating an exemplary structure in which an exemplary natural fiber-reinforced soundproofing material, an exemplary recycled soundproofing material, and an exemplary finished non-woven fabric are laminated according to an exemplary embodiment of the present invention.

In step (iv), an exemplary laminated material with an exemplary structure in which an exemplary natural fiber-reinforced soundproofing material, an exemplary recycled soundproofing material, and an exemplary finished non-woven fabric may be molded by cold molding (remolding) in a molding die to form a sound absorption part on the back surface of the part (material). For example, when only (b) the recycled soundproofing material is used in step (i), molding may be performed using the material with the structure in which the recycled soundproofing material and the finished non-woven fabric are laminated.

According to various exemplary embodiments, a sound absorption part having a thickness two times or greater than that of the existing part may be formed by a single cold molding or remolding on a material with the laminated structure at reduced temperatures, and a sound absorption part may be formed on the back surface of the part using a molding die in which the shape which is the same as that of the preheating die is introduced. In addition, a transfer which may be generated on the front surface portion of the soundproofing board part may be reduced or eliminated.

FIG. 8 is a photograph of an exemplary molding die in which an exemplary sound absorption part shape of a checkered structure is introduced. FIG. 10(a) illustrates a back surface of a package tray of a vehicle board part manufacture by a method in the related art, FIG. 10(b) illustrates an exemplary back surface of an exemplary package tray in which a checkered interval of a convex part (volume part) having a thickness of about 3 to 5 mm and a checkered structure with a tetragonal shape of a concave part (basic thickness) having a thickness of about 1.6 to 2.0 mm are formed through a molding process (remolding) process according to an exemplary embodiment of the present invention, and FIG. 10(c) illustrates an exemplary back surface of a package tray according to an exemplary embodiment of the present invention, in which the convex part having a thickness of about 3 to 5 mm has a square shape and the concave part having a thickness of about 1.6 to 2 mm is a checkered interval.

When the concave part has a tetragonal shape, a pentagonal shape, a hexagonal shape, or a modified shape thereof, the convex part may be a checkered interval, and when the convex part has a tetragonal shape, a pentagonal shape, a hexagonal shape, or a modified shape thereof, the concave part may be a checkered interval. Furthermore, as described above, the concave part may have a thickness of 1.6 to 2.0 mm which becomes the basic thickness of the soundproofing board part.

Meanwhile, the package tray manufactured by a method in the related art has a thickness of about 2 mm, and thus has rigidity. However, separate processes of placing and thermally bonding a non-woven fabric may be required to enhance sound absorption performance as shown in FIG. 10(a). On the contrary, when the package tray is manufactured by a single process according to an exemplary embodiment of the present invention, the concave part may have sufficient rigidity as a thickness of about 1.6 to 2 mm as the basic thickness of the part, and the convex part as the volume part may have sufficient sound absorption ratio with a thickness of about 3 to 5 mm. Particularly, the convex part as the volume part may serve to improve the sound absorption property with a thickness two times or greater than the thickness of the soundproofing board part in the related art, and the concave part having basic thickness may serve to improve rigidity with a thickness which is similar to that of the soundproofing board part in the related art.

The soundproofing board part which does not have both rigidity and sound absorption performance may be improved by performing step (iv) according to an exemplary method of the present invention to obtain both improved rigidity and sound absorption performance.

Figure 11:
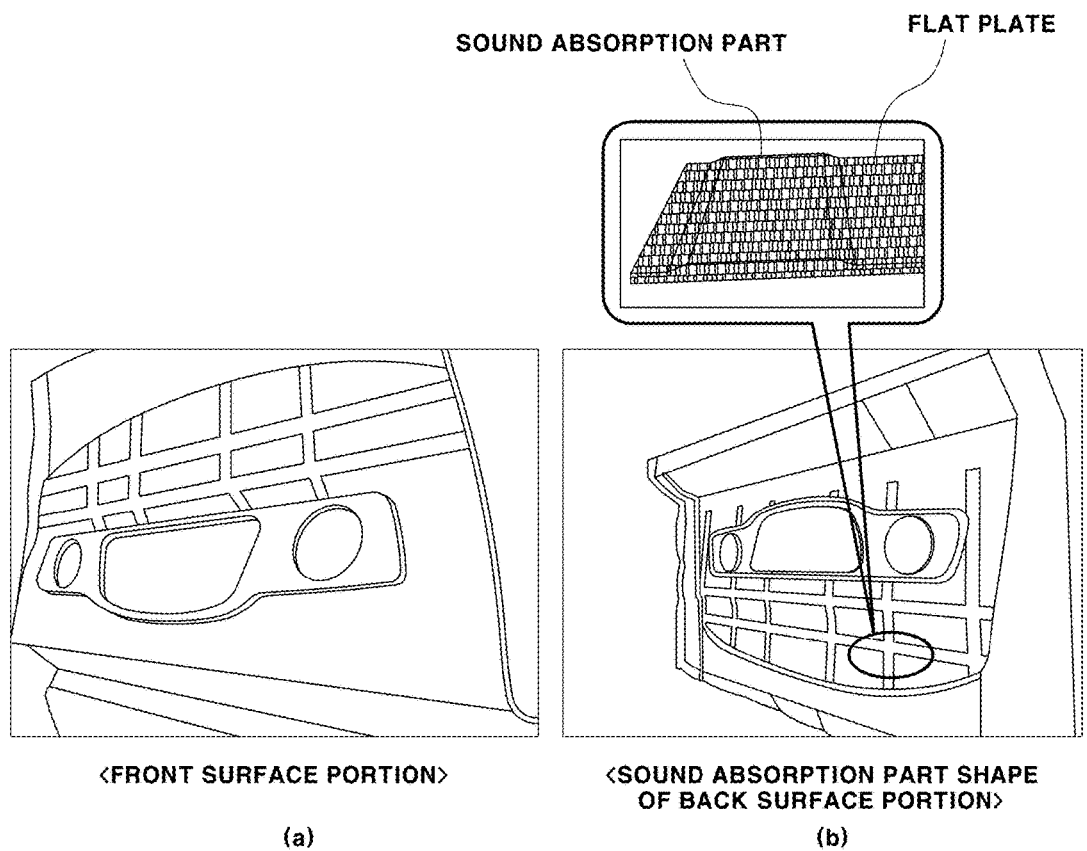
FIG. 11 shows a photograph of (a) a front surface portion and (b) a back surface portion of the soundproofing board part manufactured by the method in the related art, which also shows a transfer on (a) the front surface portion.

When a sound absorption part is introduced into the back surface of the part to improve the sound absorption property, the sound absorption part may not be transferred to the front surface portion of a final product. FIG. 11(a) shows a photograph where the sound absorption part shape is transferred to the front surface portion of the part when preheating is performed in a flat die of the related art, and then cold molding is performed in a shaped die, and FIG. 11(b) shows a photograph of the back surface part of the part.

Figure 12:
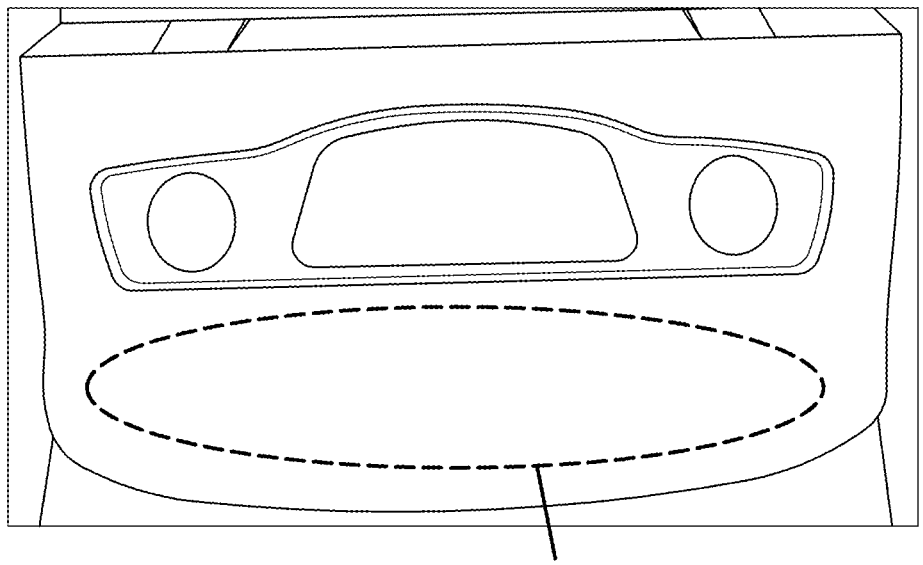
FIG. 12 shows a photograph of an exemplary soundproofing board part according to an exemplary embodiment of the present invention, which also shows that the transfer may be improved by the sound absorption part manufactured by an exemplary method according to an exemplary embodiment of the present invention.

Meanwhile, in FIG. 12, the sound absorption part is not transferred to the front surface portion of the final part manufactured according to the present invention, and thus, the transfer may be reduced or eliminated when an exemplary sound absorption part is formed by an exemplary method according to an exemplary embodiment of the present invention.

In particular, the cold molding (remolding) may be performed at a temperature of about 10 to 20° C. for about 60 to 100 seconds. When the temperature of the cold molding is less than about 10° C., process costs may increase to maintain the temperature of the mold at a reduced temperature, and the preheated soundproofing material may be rapidly cooled down during the molding, such that moldability in a part which requires stretching in a winding part may deteriorate. When the temperature is greater than about 20° C., swelling may occur due to latent heat in the product after molding such that the molded board may be swollen while the thermoplastic binder present in the soundproofing material is released by the latent heat. Accordingly, the cold molding or remolding may be performed within the range as described above. Furthermore, when the cold molding or remolding may be performed for less than about 60 seconds, part shape may not be sufficiently molded as desired, and when the cold molding or remolding may be performed for greater than about 100 seconds, the process costs may be increased. Accordingly, the cold molding (remolding) may be performed within the time range as described above.

The soundproofing board part manufactured by the method of the present invention may include: an amount of about 700 to 1,100 $g/m^2$ of the natural fiber-reinforced soundproofing material, an amount of about 700 to 1,600 $g/m^2$ of the recycled soundproofing material, and (an amount of about 250 to 450 $g/m^2$ of the finished non-woven fabric. For example, the soundproofing board part may include an amount of about 900 $g/m^2$ of the natural fiber-reinforced soundproofing material, an amount of about 1,100 $g/m^2$ of the recycled soundproofing material, and an amount of about 350 $g/m^2$ of the finished non-woven fabric. Further, the soundproofing board part manufactured by the method of the present invention may consist essentially of or consist of: an amount of about 700 to 1,100 $g/m^2$ of the natural fiber-reinforced soundproofing material, an amount of about 700 to 1,600 $g/m^2$ of the recycled soundproofing material, and an amount of about 250 to 450 $g/m^2$ of the finished non-woven fabric.

When the natural fiber-reinforced soundproofing material is not used, the recycled soundproofing material in an amount of about 700 to 1,600 $g/m^2$ and the finished non-woven fabric in an amount of about 250 to 450 $g/m^2$ may be included. For example, the recycled soundproofing material in an amount of about 1,100 $g/m^2$ and (c) the finished non-woven fabric in an amount of about 350 $g/m^2$ may be included. Further, when the natural fiber-reinforced soundproofing material is not used, the soundproofing board part manufactured by the method of the present invention may consist essentially of or consist of: the recycled soundproofing material in an amount of about 700 to 1,600 $g/m^2$ and the finished non-woven fabric in an amount of about 250 to 450 $g/m^2$.

The soundproofing board part according to exemplary embodiments of the present invention may have a maximum sound absorption ratio of about 0.38 or greater compared to 0.32 of the conventional soundproofing board part and the sound absorption performance thereof may be improved by about 20% or greater compared to the conventional soundproofing board parts. Accordingly, the soundproofing board part according to various exemplary embodiments of the present invention may be widely applied to parts which require substantial sound absorption performance, such as a luggage covering, a package tray, a covering shelf, and a luggage trim.

Hereinafter, the present invention will be described in more detail with reference to Examples. However, the following Examples are set forth to illustrate the present invention, but the scope of the present invention is not limited thereto.

EXAMPLES

The following examples illustrate the invention and are not intended to limit the same.

Hereinafter, the present invention will be described in more detail with reference to Examples. However, the following Examples are set forth to illustrate the present invention, but the scope of the present invention is not limited thereto.

Preparation Example 1: Manufacture of (a) Natural Fiber-Reinforced Soundproofing Material An amount of about 45 wt % of polypropylene (PP); an amount of about 45 wt % of jute; and an amount of about 10 wt % of polyethylene terephthalate (PET) were mixed and subjected to a general manufacturing process including carding, lamination, needle punching and thermal-roller processes, thereby manufacturing a natural fiber-reinforced soundproofing material.

Preparation Example 2: Manufacture of Recycled Soundproofing Material

An amount of about 50 wt % of a ground polyurethane (PU) foam product obtained by grinding waste sheets, an amount of about 10 wt % of a low melting point polyester-based fiber, an amount of about 20 wt % of polypropylene (PP), and an amount of about 20 wt % of kenaf were mixed and subjected to carding, lamination, needle punching, and thermal roller processes, thereby manufacturing the recycled soundproofing material.

Preparation Example 3: Manufacture of Finished Non-Woven Fabric

An amount of about 70 wt % of a polyester-based fiber and an amount of about 30 wt % of a low melting point polyester-based fiber were mixed, and subjected to carding, lamination, needle punching and thermal roller processes, thereby manufacturing a finished non-woven fabric.

Examples 1-1 to 1-5 and Comparative Example 1: Preparation of Test Specimens According to Ratio of Laminating (a) Natural Fiber-Reinforced Soundproofing Material and (b) Recycled Soundproofing Material Each material manufactured in Preparation Examples 1 to 3 was laminated according to the contents shown in Table 3, thereby preparing a test specimen of a soundproofing board part. The natural fiber-reinforced soundproofing material prepared in Preparation Example 1 and the recycled soundproofing material prepared in Preparation Example 2 were laminated and preheated at a temperature of about 200° C. for about 85 seconds using a preheating die in which a concave and convex shape of a checkered structure for a tetragonal shape was introduced. The finished non-woven fabric prepared in Preparation Example 3 was laminated on the top of the natural fiber-reinforced soundproofing material, and then was treated by cold molding (remolding) at a temperature of about 15° C. for about 85 seconds in a molding die in which a shape identical to the preheating die was introduced. Accordingly, a sound absorption part with a tetragonal shape was introduced into the back surface of the board part, and the concave part having a thickness of about 1.6 to 2.0 mm as a basic thickness of the part and convex part having a thickness of about 3 to 5 mm as a volume part are formed. As consequence, a soundproofing board part was formed.

Examples 2-1 to 2-2 and Comparative Example 2: Preparation of Soundproofing Board Part According to Sound Absorption Part Shape A test specimen of the soundproofing board part was prepared by using each material prepared in Preparation Examples 1 to 3. The natural fiber-reinforced soundproofing material prepared in Preparation Example 1 and the recycling soundproofing material prepared in Preparation Example 2 were laminated and preheated at a temperature of about 200° C. for about 85 seconds using a preheating die in which a flat shape (Comparative Example) or a concave and convex shape (Examples) was introduced. The finished non-woven fabric prepared in Preparation Example 3 was laminated on the top of the natural fiber-reinforced soundproofing material, and then was treated by cold molding (remolding) at a temperature of about 15° C. for about 85 seconds in a molding die in which a shape identical to the preheating die was introduced, thereby manufacturing a soundproofing board part in which the sound absorption part as shown in Table 4 was introduced on the back surface of the board part.

TABLE 4

| Classification | | Comparative Example 2 Flat part (Sound absorption part x) | Example 2-1 Tetragonal shape | Example 2-2 Hexagonal shape |
|---|---|---|---|---|
| Thickness (mm) | Basic thickness (Checkered interval) | 1.8-2.0 (No concave part, No convex part, flat) | 1.6-2.0 | 1.6-2.0 |
| | Volume part (Shape) | | 3.8-4.0 | 3.8-4.0 |

Examples 3-1 to 3-4: Manufacture of Soundproofing Board Part According to Size of Tetragonal Shape A test specimen of the soundproofing board part was prepared by using each material prepared in Preparation Examples 1 to 3. The natural fiber-reinforced soundproofing material prepared in Preparation Example 1 and the recycled soundproofing material prepared in Preparation Example 2 were laminated and preheated at a temperature of about 200° C. for about 85 seconds using a preheating die in which a concave and convex shape having a square checkered structure as shown in Table 5 was introduced. The finished non-woven fabric prepared in Preparation Example 3 was laminated on the top of the natural fiber-reinforced sound-

TABLE 3

| Classification | | Comparative Example 1 | Example 1-1 | Example 1-2 | Example 1-3 | Example 1-4 | Example 1-5 |
|---|---|---|---|---|---|---|---|
| Material weight (g/m$^2$) | (a) Natural fiber-reinforced soundproofing material | 1,600 | 300 | 500 | 700 | 800 | — |
| | (b) Recycled soundproofing material | — | 1,300 | 1,100 | 900 | 800 | 1,600 |
| | (c) Finished non-woven fabric | 350 | 350 | 350 | 350 | 350 | 350 |
| Test specimen length (mm) | | 51.4 | 51.4 | 49.1 | 49.5 | 50.2 | 51.0 | proofing material, and then was treated by cold molding (remolding) at a temperature of about 15° C. for about 85 seconds in a molding die in which a shape identical to the preheating die was introduced, and a soundproofing board part was finally manufactured by introduced into the back surface of the board part.

TABLE 5

| Classification | Example 3-1 | Example 3-2 | Example 3-3 | Example 3-4 |
|---|---|---|---|---|
| Length (mm) of One Side | 50 | 100 | 100 | 200 |
| Thickness (mm) of Volume Part | 4 | 4 | 5 | 4 |
| Basic Thickness (mm) | 2 | 2 | 2 | 2 |

* In this case, the basic thickness means a basic thickness of the part as a relative concave part in comparison to the volume part, and the volume part means a tetragonal shape.

Test Examples

Test Example 1: Measurement of Physical Properties

Physical properties of the test specimens prepared in Examples 1-1 to 1-5 and Comparative Example 1 were measured according to the following method, and are shown in Table 6.

(1) Measurement of Rigidity: Test specimens prepared in Examples 1-1 to 1-5 and Comparative Example 1 were allowed to have a size of about 50*150 mm, and then flexural strength was measured using a UTM device.

(2) Measurement of Sound Absorption Ratio: Each test specimen was allowed to have a size of about 840*840 mm, and then the sound absorption ratio was evaluated at a frequency of about 800 Hz to 3.15 kHz through a simple reverberation method (Alpha Cabin).

TABLE 6

| Classification | Comparative Example 1 | Example 1-1 | Example 1-2 | Example 1-3 | Example 1-4 | Example 1-5 |
|---|---|---|---|---|---|---|
| Maximum load (kgf) | 5.6 | 4.3 | 4.8 | 5.5 | 5.6 | 4.2 |
| Sound absorption ratio (α, maximum value) | 0.32 | 0.40 | 0.39 | 0.38 | 0.33 | 0.47 |

As shown in Table 6, when only the natural fiber-reinforced soundproofing material in the related art was used (Comparative Example 1), the sound absorption ratio was reduced compared to the recycled soundproofing material according to an exemplary embodiment of the present invention (Example 1). Accordingly, the use of the recycled soundproofing material may improve sound absorption performance. Meanwhile, as the amount of the recycled soundproofing material used increases, rigidity of the product may deteriorate as shown from the results of the maximum load.

As such, rigidity and sound absorption performance of the product may be adjusted by varying the amounts of the natural fiber-reinforced soundproofing material and the recycled soundproofing material used according to characteristics of the vehicle soundproofing board part.

Test Example 2: Measurement of Physical Properties

For the test specimens prepared in Examples 2-1 and 2-2 and Comparative Example 2, physical properties were measured in the same manner as in Test Example 1, and are shown in Table 7.

TABLE 7

| Classification | Comparative Example 2 Flat part (Sound absorption part x) | Example 2-1 Tetragonal shape | Example 2-2 Hexagonal shape |
|---|---|---|---|
| Maximum load (kgf) | 6.2 | 6.2 | 6.7 |
| Sound absorption ratio (α, maximum value) | 0.34 | 0.66 | 0.50 |

As shown in Table 7, when the sound absorption part was not formed on the back surface of the vehicle board as in Comparative Example 2, the sound absorption ratio may deteriorate compared to Examples 2-1 and 2-2, which had a sound absorption part in which a shape is introduced according to an exemplary embodiment of the present invention.

Accordingly, the sound absorption part with a tetragonal or hexagonal shape may improve sound absorption performance in accordance with the manufacturing process according to an exemplary embodiment of the present invention. Furthermore, for the tetragonal shape, the sound absorption ratio may be and rigidity may be reduced slightly compared to the hexagonal shape; and for the hexagonal shape, the sound absorption ratio may be reduced slightly, but rigidity may be improved compared to the tetragonal shape.

As such, according to physical properties that vehicle parts require, the sound absorption part may be introduced selectively with suitable shape. For example, the hexagonal shape may be introduced into parts which require substantial rigidity and moderate sound absorption performance, whereas the tetragonal shape may be introduced into parts which require substantial sound absorption performance and moderate rigidity.

Test Example 3: Measurement of Physical Properties

For the test specimens prepared in Examples 3-1 and 3-4, physical properties were measured in the same manner as in Test Example 1, and are shown in Table 8.

TABLE 8

| Classification | Example 3-1 | Example 3-2 | Example 3-3 | Example 3-4 |
|---|---|---|---|---|
| Maximum load (kgf) | 6.7 | 6.2 | 5.3 | 5.8 |
| Sound absorption ratio | 0.34 | 0.66 | 0.50 | 0.65 |

TABLE 8-continued

| Classification | Example 3-1 | Example 3-2 | Example 3-3 | Example 3-4 |
|---|---|---|---|---|
| (α, maximum value) | | | | |

As shown in Table 8, Examples 3-1 to 3-4 are board parts in which the square sound part was formed with various the length (mm) at one side, and sound absorption ratio and rigidity may depend on the area and thickness of the convex part. Accordingly, rigidity and sound absorption performance may be adjusted by varying the thickness and shape of the sound absorption part shape of the die according to various characteristics of physical properties required for the soundproofing board part.

According to various exemplary embodiments of the present invention, a sound absorption part which has a thickness two times or greater than that of the soundproofing board part manufactured by disposing and thermally bonding a non-woven fabric on the back surface of the part in the related art may be formed by using, as a material, a recycled soundproofing material. In addition, by performing molding the recycled soundproofing material two times through a preheating die and a molding die having the same sound absorption part shape, substantially improved sound absorption performance may be obtained. Furthermore, the sound absorption part may be implemented through the secondary molding to reduce or eliminate a transfer which may be generated on the front surface portion, and thus may be widely applied to parts which require substantial sound absorption performance, such as a luggage covering, a package tray, a covering shelf, and a luggage trim.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a soundproofing board part having improved sound absorption performance, comprising:
   preparing a recycled soundproofing material manufactured from a ground polyurethane (PU) foam product obtained by grinding waste sheets; and
   molding the recycled soundproofing material in a preheating die and a molding die which are configured to include a sound absorption part shape with a checkered structure to form a sound absorption part on a back surface of the soundproofing board part,
   wherein the molding die is a die in which a shape of the sound absorption part which is the same as that of the preheating die is introduced.

2. The method of claim 1, wherein the sound absorption part shape is a concave shape and a convex shape of the checkered structure that is selected from a tetragonal shape, a pentagonal shape, a hexagonal shape, or a modified shape thereof, and
   the soundproofing board part has a basic thickness of about 1.6 to 2 mm, and comprises the sound absorption part comprising a volume part having a thickness of about 3 to 5 mm.

3. The method of claim 2, wherein the volume part is configured to absorb sound.

4. The method of claim 2, wherein the volume part has a tetragonal shape, a pentagonal shape, a hexagonal shape, or a modified shape thereof.

5. The method of claim 2, wherein the sound absorption part having the basic thickness part of 1.6 to 2 mm in the soundproofing board part has a tetragonal shape, a pentagonal shape, a hexagonal shape, or a modified shape thereof.

6. The method of claim 1, comprising:
   (i) preparing a soundproofing material as a two-layer structure by laminating a natural fiber-reinforced soundproofing material and the recycled soundproofing material;
   (ii) preheating the laminated soundproofing material in a preheating mold;
   (iii) laminating a finished non-woven on the laminated soundproofing material which is preheated in step (iii); and
   (iv) forming, in the molding die, the sound absorption part on the soundproofing board part by performing cold molding on the soundproofing material of step (iii) including the natural fiber-reinforced soundproofing material, the recycled soundproofing material, and the finished non-woven fabric,
   wherein the molding die in step (iv) is a die in which a shape of the sound absorption part which is the same as that of the preheating die in step (ii) is introduced.

7. The method of claim 1, comprising:
   (i) preparing the recycled soundproofing material;
   (ii) preheating the recycled soundproofing material in a preheating mold;
   (iii) laminating a finished non-woven fabric on the soundproofing material which is preheated in step (ii); and
   (iv) forming, in the molding die, the sound absorption part on the part by performing cold molding on the soundproofing material of step (iii) including the recycled soundproofing material and the finished non-woven fabric,
   wherein the molding die in step (iv) is a die in which a shape of the sound absorption part which is the same as that of the preheating die in step (ii) is introduced.

8. The method of claim 6, wherein the natural fiber-reinforced soundproofing material in step (i) is manufactured by mixing an amount of about 40 to 50 wt % of polypropylene (PP); an amount of about 40 to 50 wt % of kenaf; and an amount of about 0 to 20 wt % of polyethylene terephthalate (PET), based on the total weight of the natural fiber-reinforced soundproofing material; and by a process comprising carding, lamination, needle punching, and thermal-roller processes.

9. The method of claim 6, wherein the recycled soundproofing material is manufactured by mixing an amount of about 40 to 60 wt % of the ground polyurethane (PU) foam product; an amount of about 10 to 20 wt % of a low melting point polyester-based fiber; an amount of about 10 to 20 wt % of polypropylene (PP); and an amount of about 10 to 20 wt % of kenaf, based on the total weight of the recycled soundproofing material; and by a process comprising carding, lamination, needle punching, and thermal-roller processes.

10. The method of claim 7, wherein the recycled soundproofing material is manufactured by mixing an amount of about 40 to 60 wt % of the ground polyurethane (PU) foam; an amount of about 10 to 20 wt % of a low melting point polyester-based fiber; an amount of about 10 to 20 wt % of polypropylene (PP); and an amount of about 10 to 20 wt % of kenaf, based on the total weight of the recycled soundproofing material; and by a process comprising carding, lamination, needle punching, and thermal-roller processes.

11. The method of claim 9, wherein the recycled soundproofing material further comprises an amount of about 0 to 20 wt % of glass fiber, based on the total weight of the recycled soundproofing material.

12. The method of claim 9, wherein the ground polyurethane (PU) foam product is ground to have a size of about 3 mm or less.

13. The method of claim 10, wherein the recycled soundproofing material further comprises an amount of about 0 to 20 wt % of glass fiber, based on the total weight of the recycled soundproofing material.

14. The method of claim 10, wherein the ground polyurethane (PU) foam product is ground to have a size of about 3 mm or less.

15. The method of claim 8, wherein the kenaf is jute, flax (Lien), hemp, or ramie.

16. The method of claim 10, wherein the kenaf is jute, flax (Lien), hemp, or ramie.

17. The method of claim 6, wherein the preheating in step (ii) is performed at a temperature of about 190 to 220° C. for about 60 to 100 seconds in the preheating die.

18. The method of claim 7, wherein the preheating in step (ii) is performed at a temperature of about 190 to 220° C. for about 60 to 100 seconds in the preheating die.

19. The method of claim 6, wherein the sound absorption part shape of the preheating die is a concave shape and a convex shape of the checkered structure that is selected from a tetragonal shape, a pentagonal shape, a hexagonal shape, or a modified shape thereof.

20. The method of claim 7, wherein the sound absorption part shape of the preheating die is a concave shape and a convex shape of the checkered structure that is selected from a tetragonal shape, a pentagonal shape, a hexagonal shape, or a modified shape thereof.

21. The method of claim 6, wherein the sound absorption part shape is a concave shape and a convex shape of the checkered structure that is selected from a tetragonal shape, a pentagonal shape, a hexagonal shape, or a modified shape thereof.

22. The method of claim 7, wherein the sound absorption part shape is a concave shape and a convex shape of the checkered structure that is selected from a tetragonal shape, a pentagonal shape, a hexagonal shape, or a modified shape thereof.

23. The method of claim 6, wherein the sound absorption part formed on the back surface of the soundproofing board part in step (iv) has a basic thickness of about 1.6 to 2 mm through the molding process, and comprises a volume part having a thickness of about 3 to 5 mm.

24. The method of claim 7, wherein the sound absorption part formed on the back surface of the soundproofing board part in step (iv) has a basic thickness of about 1.6 to 2 mm through the molding process, and comprises a volume part having a thickness of about 3 to 5 mm.

25. The method of claim 23, wherein the volume part is configured to absorb sound using a tetragonal shape, a pentagonal shape, a hexagonal shape, or a modified shape thereof.

26. The method of claim 24, wherein the volume part is configured to absorb sound using a tetragonal shape, a pentagonal shape, a hexagonal shape, or a modified shape thereof.

27. The method of claim 6, wherein the cold molding in step (iv) is performed at a temperature of about 10 to 20° C. for about 60 to 100 seconds.

28. The method of claim 7, wherein the cold molding in step (iv) is performed at a temperature of about 10 to 20° C. for about 60 to 100 seconds.

* * * * *